US008166147B2

(12) United States Patent
Pirozzi

(10) Patent No.: US 8,166,147 B2
(45) Date of Patent: Apr. 24, 2012

(54) POWER USAGE REDUCTION SYSTEM AND METHOD

(75) Inventor: Timothy J. Pirozzi, Rochester, NH (US)

(73) Assignee: Computer Associates Think, Inc., Islandia, NY (US)

( * ) Notice: Subject to any disclaimer, the term of this patent is extended or adjusted under 35 U.S.C. 154(b) by 274 days.

(21) Appl. No.: 12/259,739

(22) Filed: Oct. 28, 2008

(65) Prior Publication Data

US 2010/0115082 A1    May 6, 2010

(51) Int. Cl.
G06F 15/173    (2006.01)
G06F 15/177    (2006.01)
(52) U.S. Cl. .................. 709/223; 709/220; 709/221
(58) Field of Classification Search .................. 709/223, 709/224, 226
See application file for complete search history.

(56) References Cited

U.S. PATENT DOCUMENTS

| 6,429,642 | B1 | 8/2002 | Rodilla Sala |
| 6,715,088 | B1 | 3/2004 | Togawa |
| 7,209,805 | B2 | 4/2007 | Motoyama |
| 7,245,936 | B2 | 7/2007 | Bahl et al. |
| 7,250,848 | B2 | 7/2007 | White, II |
| 7,269,752 | B2 | 9/2007 | John |
| 7,275,103 | B1 * | 9/2007 | Thrasher et al. ............... 709/224 |
| 2002/0143999 | A1 * | 10/2002 | Yamagami ..................... 709/249 |
| 2005/0091353 | A1 * | 4/2005 | Gopisetty et al. ............. 709/223 |
| 2005/0209951 | A1 | 9/2005 | Aron et al. |
| 2005/0226200 | A1 | 10/2005 | Askildsen et al. |
| 2006/0189343 | A1 | 8/2006 | Park |
| 2007/0255814 | A1 * | 11/2007 | Green et al. ................... 709/223 |
| 2009/0276513 | A1 * | 11/2009 | Holdaway et al. ............. 709/223 |
| 2010/0023614 | A1 * | 1/2010 | Lewis et al. ................... 709/224 |

FOREIGN PATENT DOCUMENTS

JP        4217817        8/1992

* cited by examiner

*Primary Examiner* — Thu Nguyen
*Assistant Examiner* — Joseph Greene
(74) *Attorney, Agent, or Firm* — Schwegman, Lundberg & Woessner, P.A.

(57) ABSTRACT

A computer implemented method includes collecting information from multiple network devices regarding utilization over a predetermined period of time. Unused device resources are identified, along with device resources that may be consolidated. Such identifications are provided to a user for use in consolidating the network to reduce power consumption.

19 Claims, 13 Drawing Sheets

POWER USAGE REDUCTION SYSTEM AND METHOD

BACKGROUND

In a conventional computer system in which a large number of computers are connected to a network, each computer may control its own power consumption. In such a system, the power-saving control of each computer is performed in accordance with a power-saving program set by each user. When coupled to a network, the computer power-saving program may be implemented at a network level, allowing power saving on a broader basis. In equipment rooms for larger installations of computers, such as switching equipment and server farms, the power management may be similarly based on needs of each of the components in the equipment room. This may result in an unnecessarily large amount of power consumption.

SUMMARY

A computer implemented method includes collecting information from multiple network devices regarding utilization over a predetermined period of time. Unused device resources are identified, along with device resources that may be consolidated. Such identifications are provided to a user for use in consolidating the network to reduce power consumption. A computer readable medium having instructions for execution on a computer may also be provided.

In a further embodiment, a computer implemented method includes collecting information from multiple network devices regarding utilization over a predetermined period of time. Unused device resources are identified, as are device resources that may be consolidated by grouping boards by technology type. Ports that are unavailable or available are counted, and it is determined whether ports may be consolidated to boards on a same device or to a different device. Efficient devices that may be exchanged for existing devices are identified by ensuring that the efficient device supports existing device port types at the same speed. Such identifications are provided to a user for use in consolidating the network to reduce power consumption.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

In various embodiments, network monitoring and performance calculations are used to determine potential power savings by consolidation of hardware. In some embodiments, power savings may be obtained by replacing existing hardware with smaller or more efficient devices. A network of devices is assessed to identify network routers, switches, servers, hosts, wireless network devices, etc., that can be potentially consolidated and/or shut down to reduce power consumption in the network. In one embodiment, the assessment is performed using real performance or activity data measured over predetermined periods of time. Identification may include devices not performing any type of work, ports and boards in a chassis that can be potentially consolidated to other boards and pulled. Network routers and switches may be removed from the network by migrating port connections to other devices.

Figure 1:
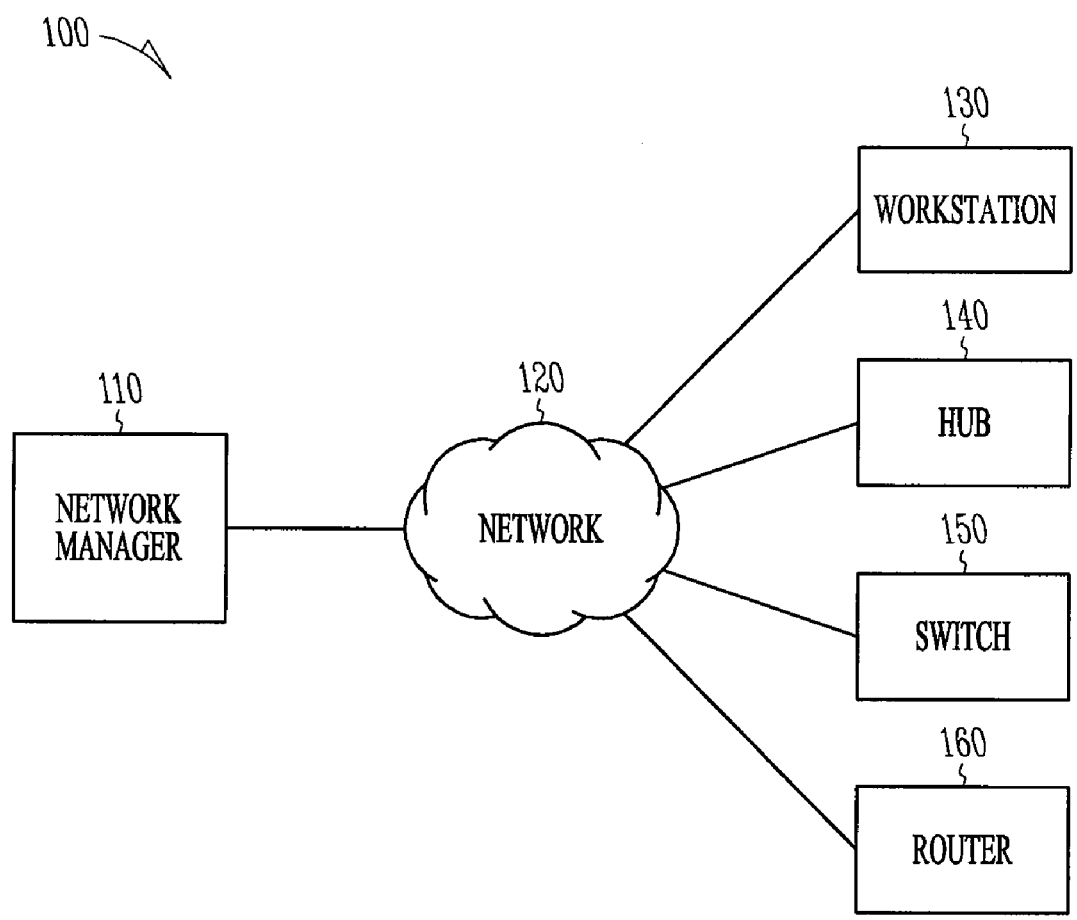
FIG. 1 is a block diagram of a network system according to an example embodiment.

FIG. 1 is a block diagram of a network system 100. A network manager 110 is coupled to a network 120, such as the internet, or other private or public network that provides the ability to communicate with multiple units coupled to the network. The units are represented by a workstation block 130, hub 140, switch 150 and router 160. These units are representative of the types of units that may be coupled to the network, and the blocks are also representative of one or more of each of such units.

In one embodiment, network manager 110 collects information about the units and devices within the units that may be used to identify efficiencies in power utilization. A SPECTRUM Fault Management system may be used to perform such functions, and collect information from devices in the units, such as CPU usage, processes information, physical location, port counts (speed, throughput packet counts in/out, and port status, such as SNMP MIB2 ifAdminStatus and ifOperStatus. The data in one embodiment is representative of actual performance and/or activity of the network devices over a predetermined time period. Board counts, such as board to port mappings may also be collected along with information identifying power supplies and power usage. Further data may include routing tables and switching tables. In further embodiments, other information useful in identifying potential efficiencies in power utilization may be collected.

Figure 2:
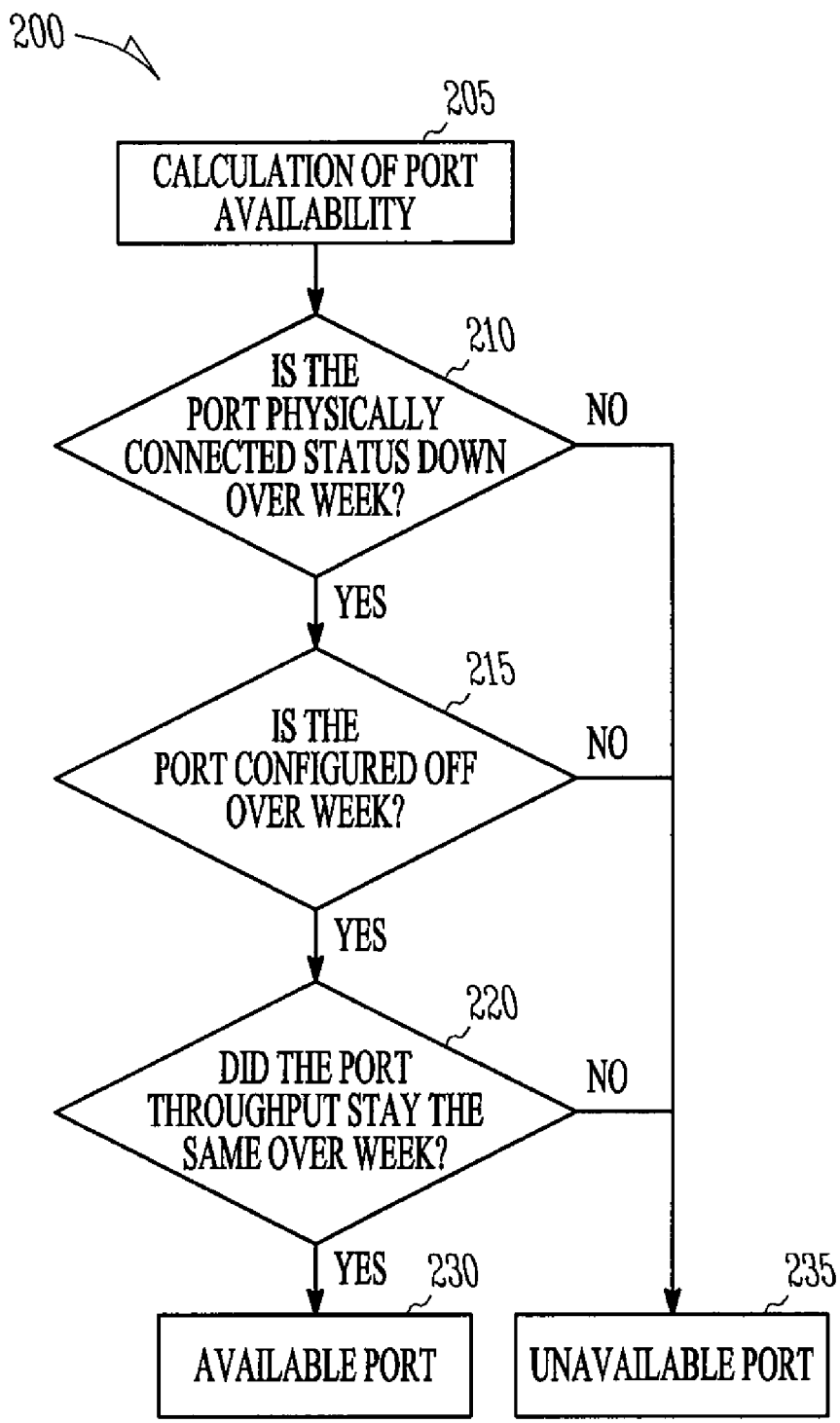
FIG. 2 is a flowchart of a computer executable method of calculating port availability according to an example embodiment.

The network manager 110, or another network device may then perform one or more different methods to determine potential changes to the network units to make power utilization more efficient. In FIG. 2, generally at 200, a method of calculating port availability 205 is illustrated in flowchart form. At 210, a determination is made from the collected information whether a port is physically connected with a status of down over a week of time. If yes, a determination is made at 215 if the port is configured off over a week. If yes, a determination is made whether the port throughput stayed the same over the week at 220. If the answer to all the determinations is yes, then the port is found available at 230. However, if any of the above determinations is no, then the port is found to be unavailable at 235. The port availability 205 method may be performed for multiple ports of multiple devices coupled to the network to determine how many ports are not being used or are otherwise available. In one embodiment, the user is provided the ability to set thresholds for the maximum number of network packets that the port can send and receive to identify the port availability.

Figure 3:
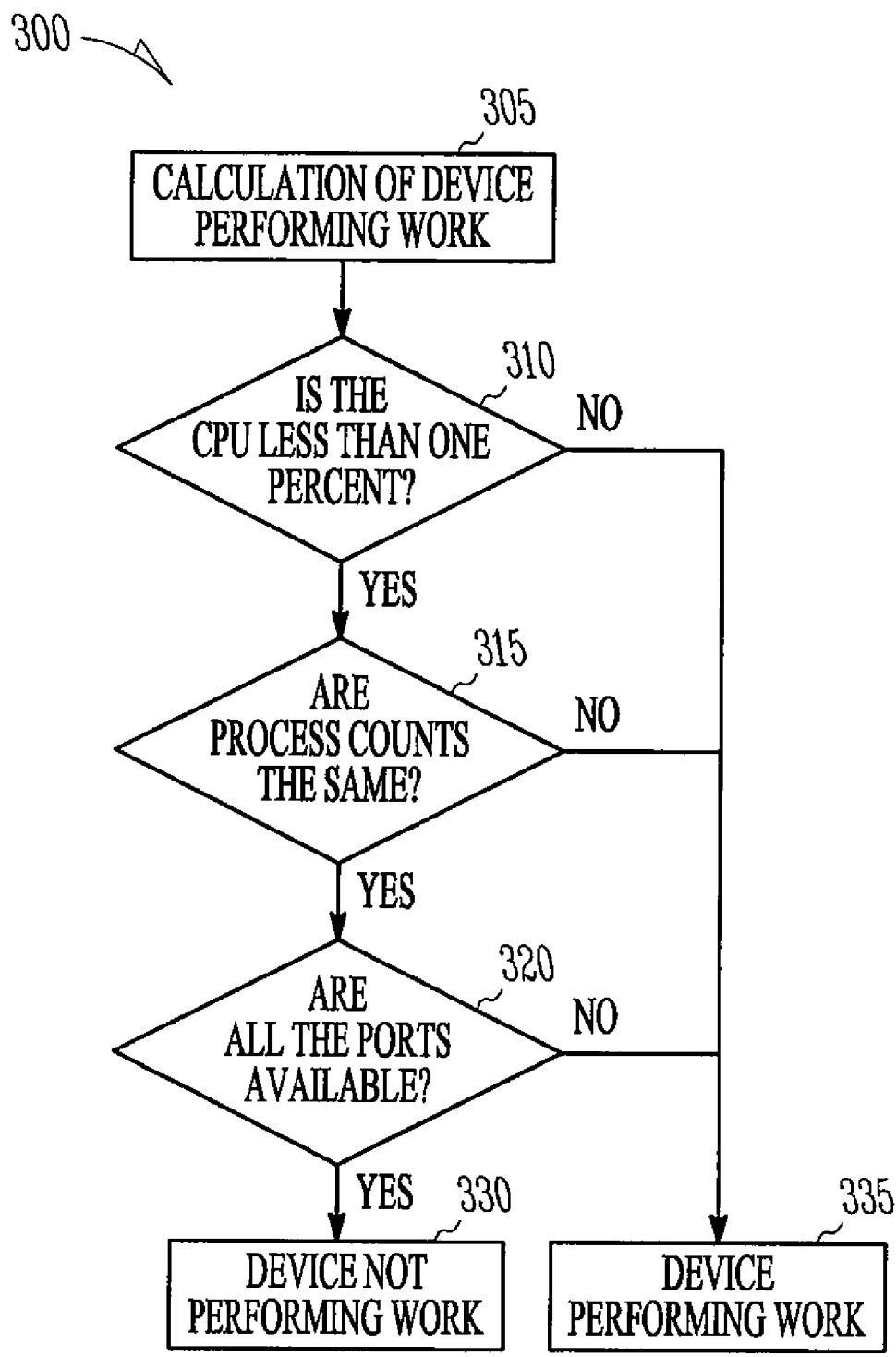
FIG. 3 is a flowchart of a computer executable method of calculating whether a device is performing work according to an example embodiment.

The network manager 110, or another network device may then perform a method 300 in accordance with the flowchart of FIG. 3. At 305, the method begins to calculate whether a device is performing work. If the CPU utilization at 310 is less than 1%, and if the process counts are the same at 315, and if all the ports associated with the CPU are available at 320, then it is determined that the device is not performing work at 330. Otherwise, if any of the above are not true, then the device is identified as performing work at 335. The utilization percentage in one embodiment is an adjustable percentage configurable by the user at run time.

Figure 4:
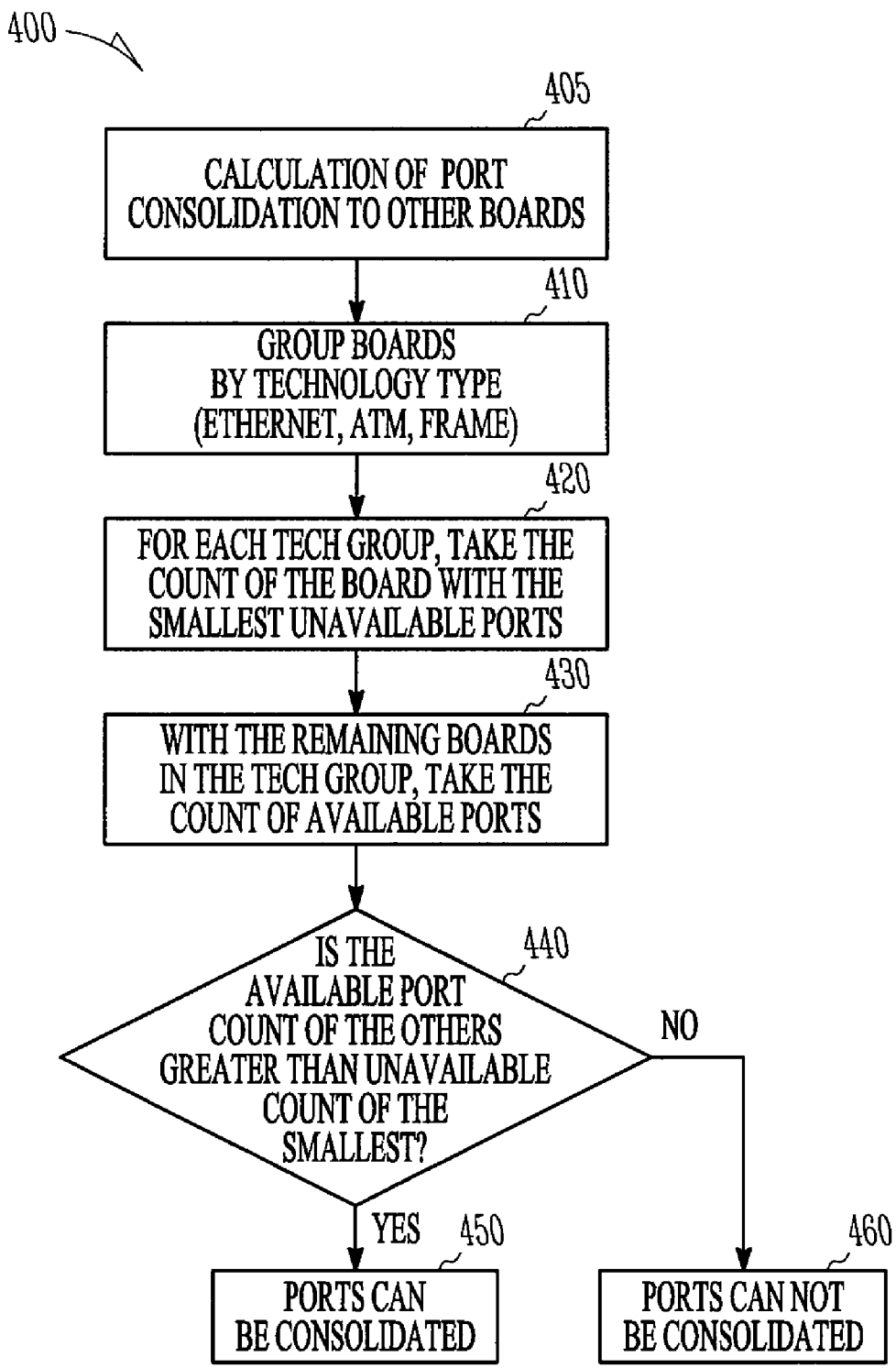
FIG. 4 is a flowchart of a computer executable method of calculating potential port consolidation to various circuit boards according to an example embodiment.

The network manager 110, or another network device may then perform a method 400 in accordance with the flowchart of FIG. 4. At 405, the method begins to calculate potential port consolidation to various circuit boards. At 410, boards are grouped by technology type, such as Ethernet, ATM, Frame Relay, etc. This information is collected from the devices either prior to method 400 executing, or during execution of method 400. At 420, for each technology group a count is taken of the board with the smallest number of unavailable ports. With the remaining boards in the technology group, the number of available ports is also counted at 430.

At 440, the method decides whether the available port count of the remaining boards from 430 is greater than the unavailable count of the board with the smallest number of unavailable ports. If yes, it is noted that ports can be consolidated at 450. This may be an iterative logic step until no further boards can be consolidated down. If no, at 460, it is noted that the ports can not be consolidated.

Figure 5:
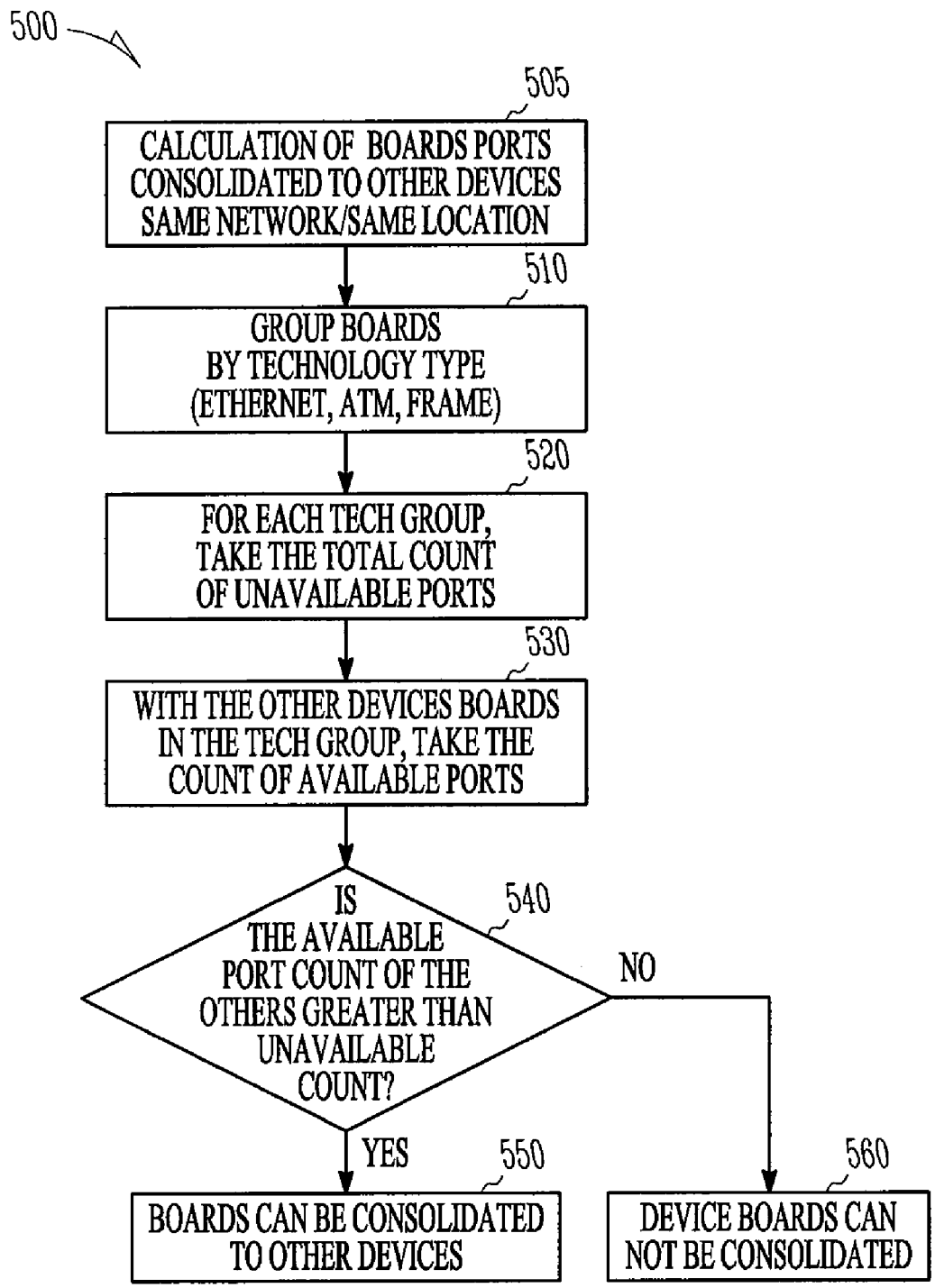
FIG. 5 is a flowchart of a computer executable method of calculating consolidation of board ports to other devices in the same network and same physical location according to an example embodiment.

The network manager 110, or another network device may then perform a method 500 in accordance with the flowchart of FIG. 5. At 505, the method begins to calculate consolidation of board ports to other devices in the same network and same physical location. At 510, boards are again grouped by technology type, such as Ethernet, ATM, Frame, etc. For each technology group, a count is taken of the total number of unavailable ports at 520. The count of available ports for other devices' boards in the technology group is taken at 530. At 540, the method decides if the available port count of the others is greater than the unavailable count. If yes, at 550, it is noted that boards can be consolidated to other devices. This may be an iterative logic step until no further boards can be consolidated down. If no, at 560, it is noted that the boards can not be consolidated.

Figure 6:
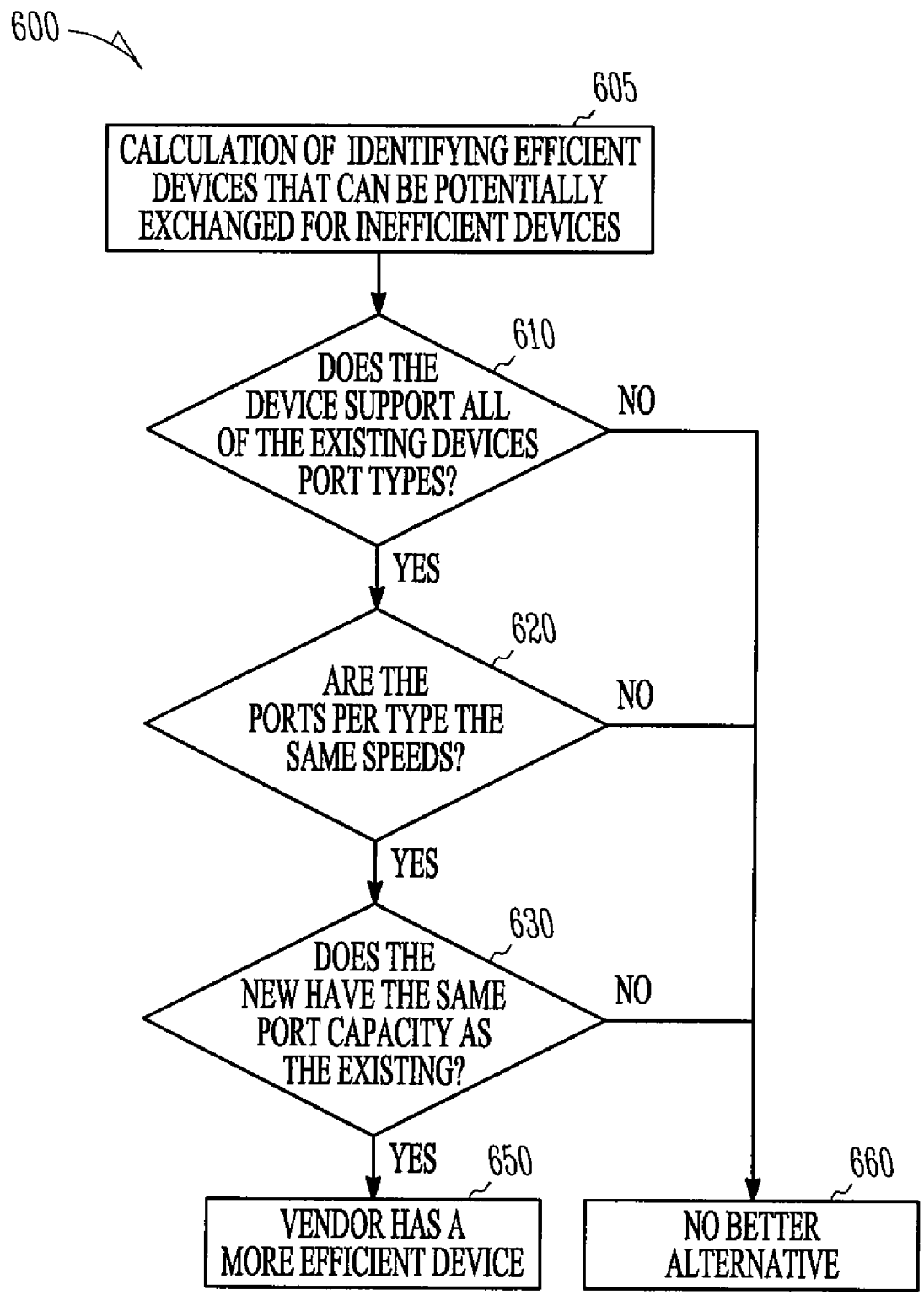
FIG. 6 is a flowchart of a computer executable method of identifying efficient devices that may be exchanged for inefficient devices according to an example embodiment.

The network manager 110, or another network device may then perform a method 600 in accordance with the flowchart of FIG. 6. At 605, the method begins to identify efficient devices that may be exchanged for inefficient devices. At 610, the method determines whether a device supports all the existing devices port types. Then, it is determined if the ports per type are the same speeds at 620 and if the new device has the same port capacity as the existing device at 630. If all the decisions are yes, it is noted that a new efficient device may be used at 650. If no, there is no better alternative in terms of energy efficiency at 660.

Figure 7:
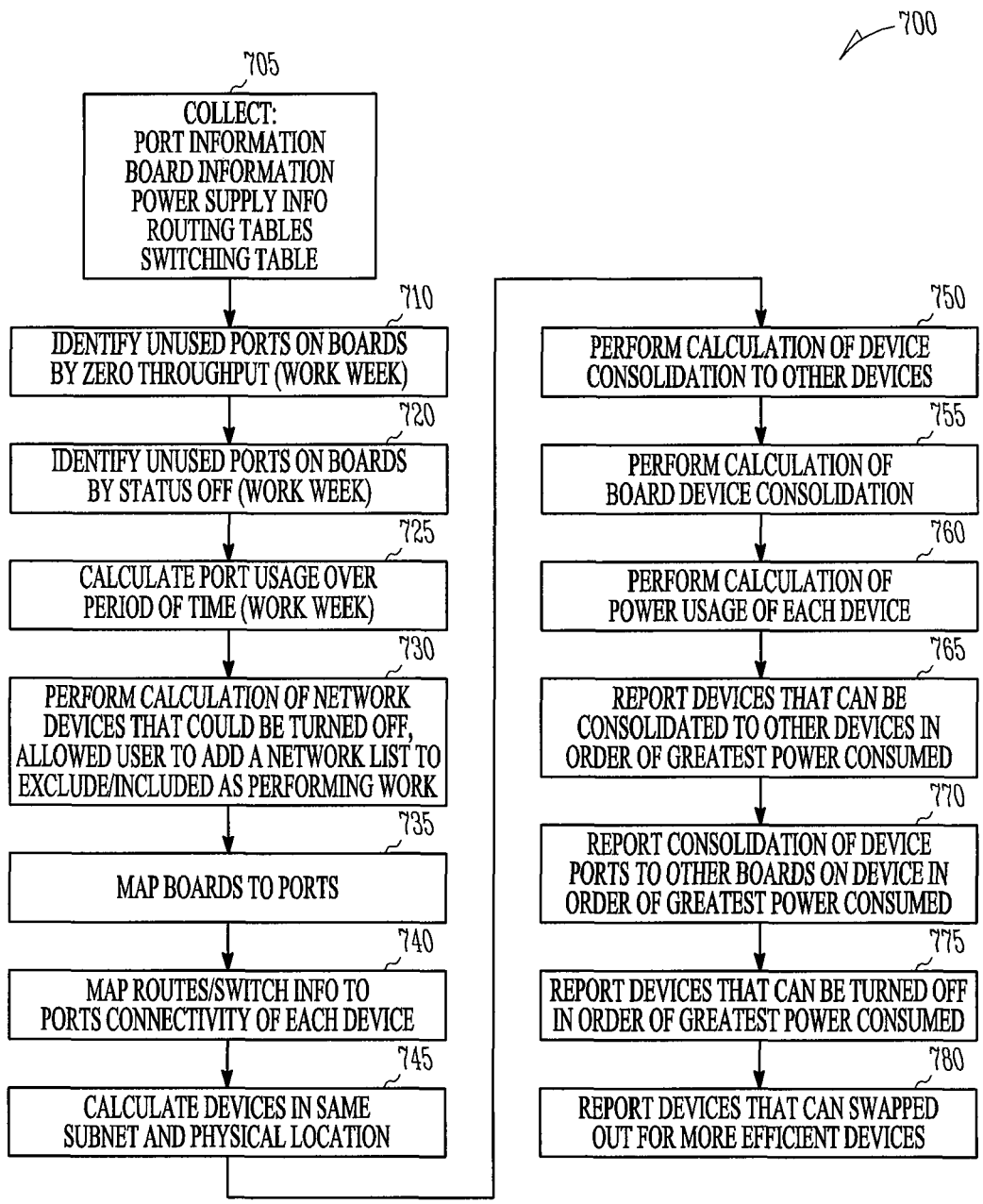
FIG. 7 is a flowchart of a computer executable method of identifying power reductions according to an example embodiment.

FIG. 7 provides an overview of the entire process 700 of identifying power reductions. At 705, process 700 collects port information, board information, power supply information, routing tables and switching tables. Unused ports on the boards are determined at 710 by zero network packets per work week. At 720, unused ports on boards by status off per work week are identified. Port usage over a period of time, such as a work week, is then calculated at 725. While the period of time for each of the above collected information is a work week, further embodiments may utilize different time periods, such as a number of hours, days, weeks, etc.

Once the information is collected and identified, a calculation of network devices that could be turned off is performed at 730. At 730, user input may be taken into consideration to include or exclude as performing work. At 735, boards are mapped to ports. This may be done by the network manager 110 in one embodiment. At 740, routes and switch information are mapped to ports connectivity of each device. At 745, the process calculates device in the same subnet and physical location, using the information collected and the maps. At 750, device consolidation is performed to allocate functions performed by a device to be turned off to other devices.

At 755, the process performs a calculation of board device consolidation. At 760, the power usage of each device is determined. Devices that can be consolidated to other devices are ranked in order of greatest power consumed at 765. A report or list may be provided. At 770, a report or list of consolidation of device ports to other boards on the device is provided with an indication of greatest power consumed. Devices that can be turned off are also reported in order of greatest power consumed at 775. At 780, devices than can be swapped out for more efficient devices are reported. The reports or lists can be set forth according to rank, or a rank may be provided with each in a sorted form, either electronically, or via print out or display, allowing an operator to select desired actions, such as performing the actual consolidations and/or replacements described in the reports.

Figure 8:
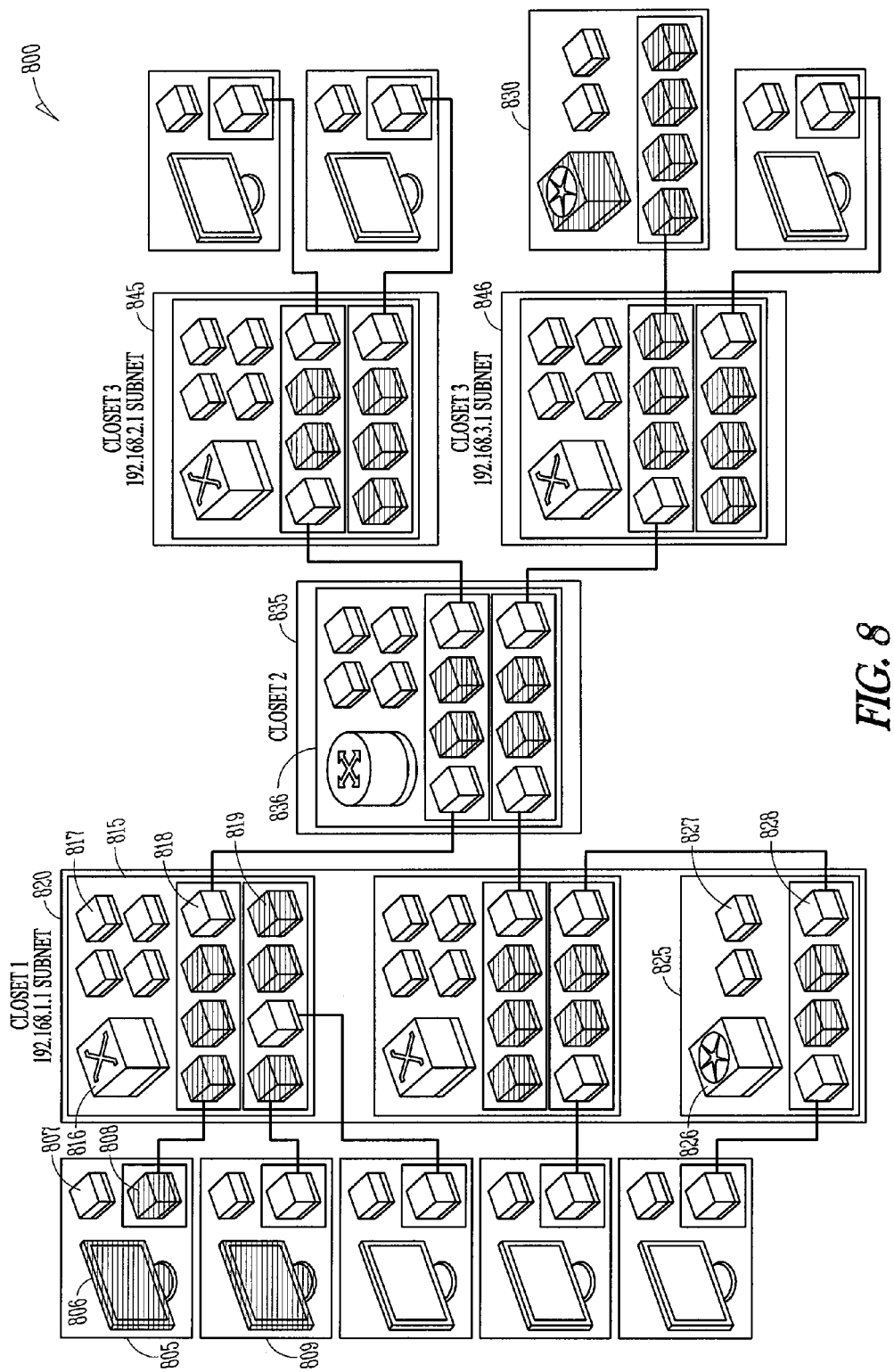
FIG. 8 is a block diagram of an example network according to an example embodiment.

An example of a network 800 using 32 units of power from one week of analysis is illustrated in block diagram form in FIG. 8. A work station 805 contains a CPU 806, power supply 807 and one Ethernet port 808 in one embodiment. The power supply uses one unit of power regardless of whether the CPU is performing a percentage of work, or whether the port is passing traffic. Several work stations are represented in the network 800. The analysis in this embodiment reveals that work station 805 and work station 809 have CPUs that are not performing a percentage of work, and their corresponding ports are not passing traffic. This is indicated by shading that is different from active work stations. Other devices in the network 800 are also indicated with such shading representing inactivity.

A switch network is indicated at 815 and consists of a switch network CPU 816, a power supply that uses four units of power at 817 and two boards of four Ethernet ports each at 818, 819. In one embodiment, even if some of the ports are not used, the energy consumption is still about four units of power. Again, the shading indicates inactivity of the shaded device. If one board is removed, the power supply will use three units of power. Three ports in each of the two boards are illustrated as inactive. In one embodiment, the switch network 815 is physically located in a closet 820, having an IP address of 192.168.1.1 Subnet for example. Closet 820 is shown has having two switches, and a hub indicated at 825. Hub 825 includes a repeater engine CPU 826, a power supply that uses two units of power at 827, and board 828 having four Ethernet ports. There are two hubs in this example network, the other being indicated at 830.

A second closet 835 is also included in network 800, and includes a router 836. Router 836 includes a router network CPU 837, a power supply 838 that consumes four units of power as represented by the four power supply icons, and two boards 839, 840, each having four Ethernet ports. If a board is removed from the router device, the power supply will only use three units of power in this example.

A third closet consists of a first subnet 845 and a second subnet 846, with different IP addresses, and each containing switches. The shading of the corresponding ports and CPUs in the network 800 indicate the inactivity of the shaded elements. Not shown in network 800 is an efficient router network unit, where only three units of power are used for two boards of four ports, and only two units of power are used for one board of four ports. Such boards will be available for use to improve the efficiency of the network 800 in accordance with lists as described above in process 700.

Figure 9:
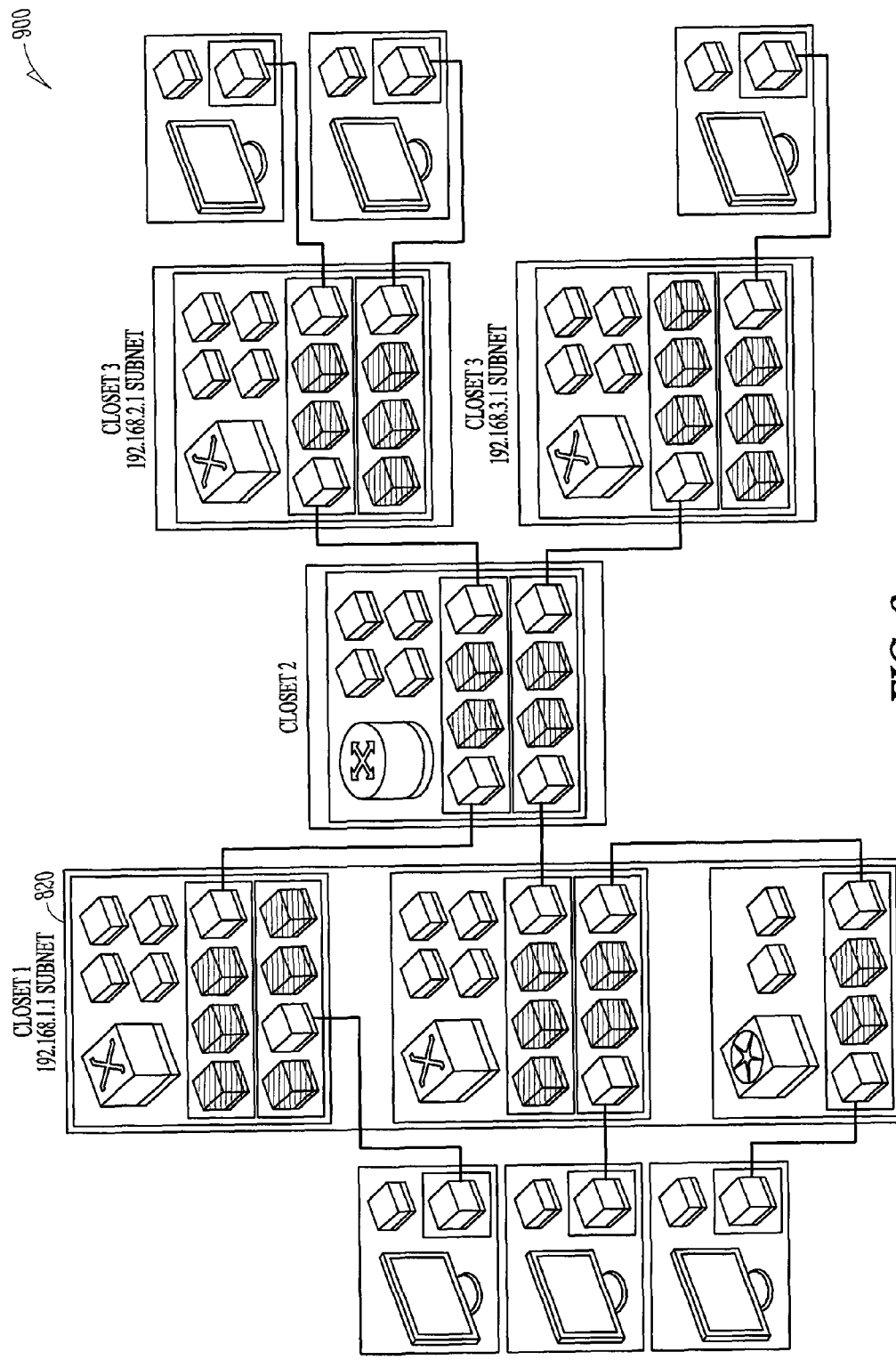
FIG. 9 is a block diagram of the example network of FIG. 8 following determining which devices are performing work according to an example embodiment.

A network 900 is illustrated in block diagram form in FIG. 9. Network 900 results from actions that can be taken with regard to network 800 after determining which devices are performing work. Note that two work stations were removed, as was hub 830, since they were not performing work. The shading in FIG. 9 still represents elements that are not being utilized.

Figure 10:
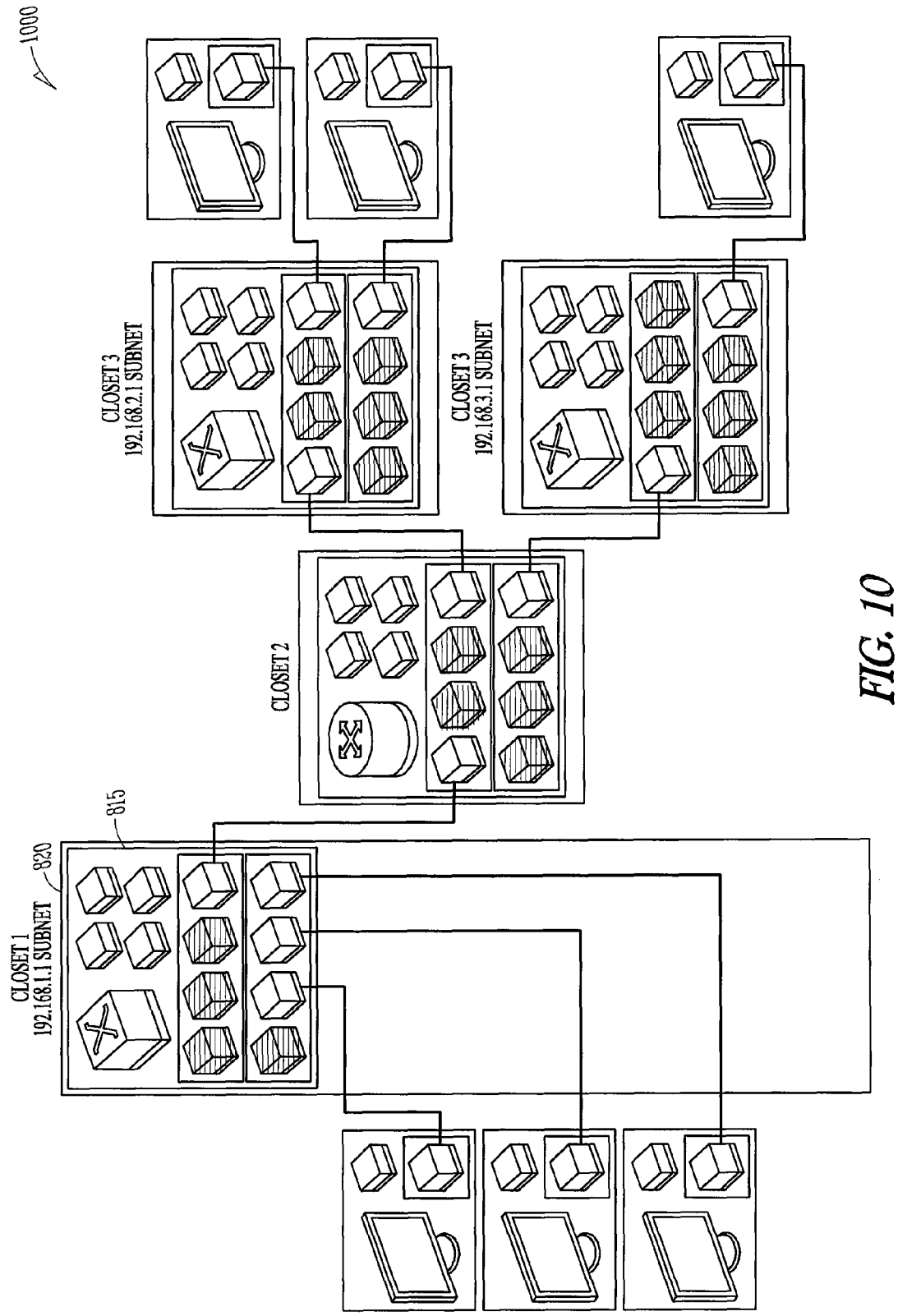
FIG. 10 is a block diagram of the example network of FIG. 8 following consolidating devices in the same subnet and location according to an example embodiment.

A network 1000 is illustrated in block diagram form in FIG. 10. Significant changes occurred in closet 820 as a result of consolidating devices in the same subnet and location. Note that functions performed by one switch, and hub 825 were consolidated into switch 815.

Figure 11:
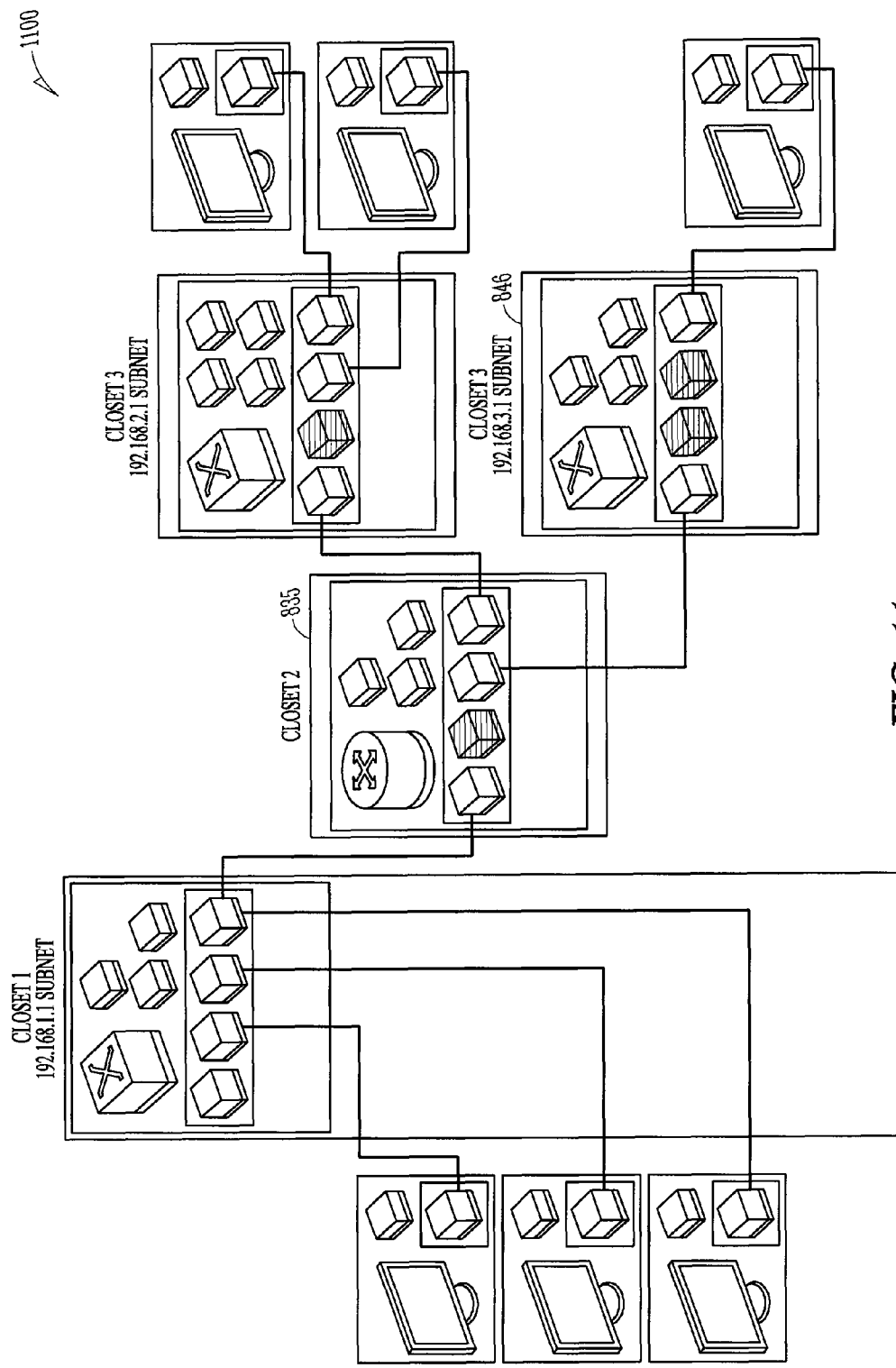
FIG. 11 is a block diagram of the example network of FIG. 8 following consolidation of ports to other boards according to an example embodiment.

A network 1100 is illustrated in block diagram form in FIG. 11. Consolidation of ports to other boards has been performed. Note that switch 815 has been reduced to one board, resulting in one less power unit being consumed. Router 835 has similarly been reconfigured to one board and one less unit of power. The switch in closet 846 has been similarly reconfigured, resulting in one less unit of power being consumed.

Figure 12:
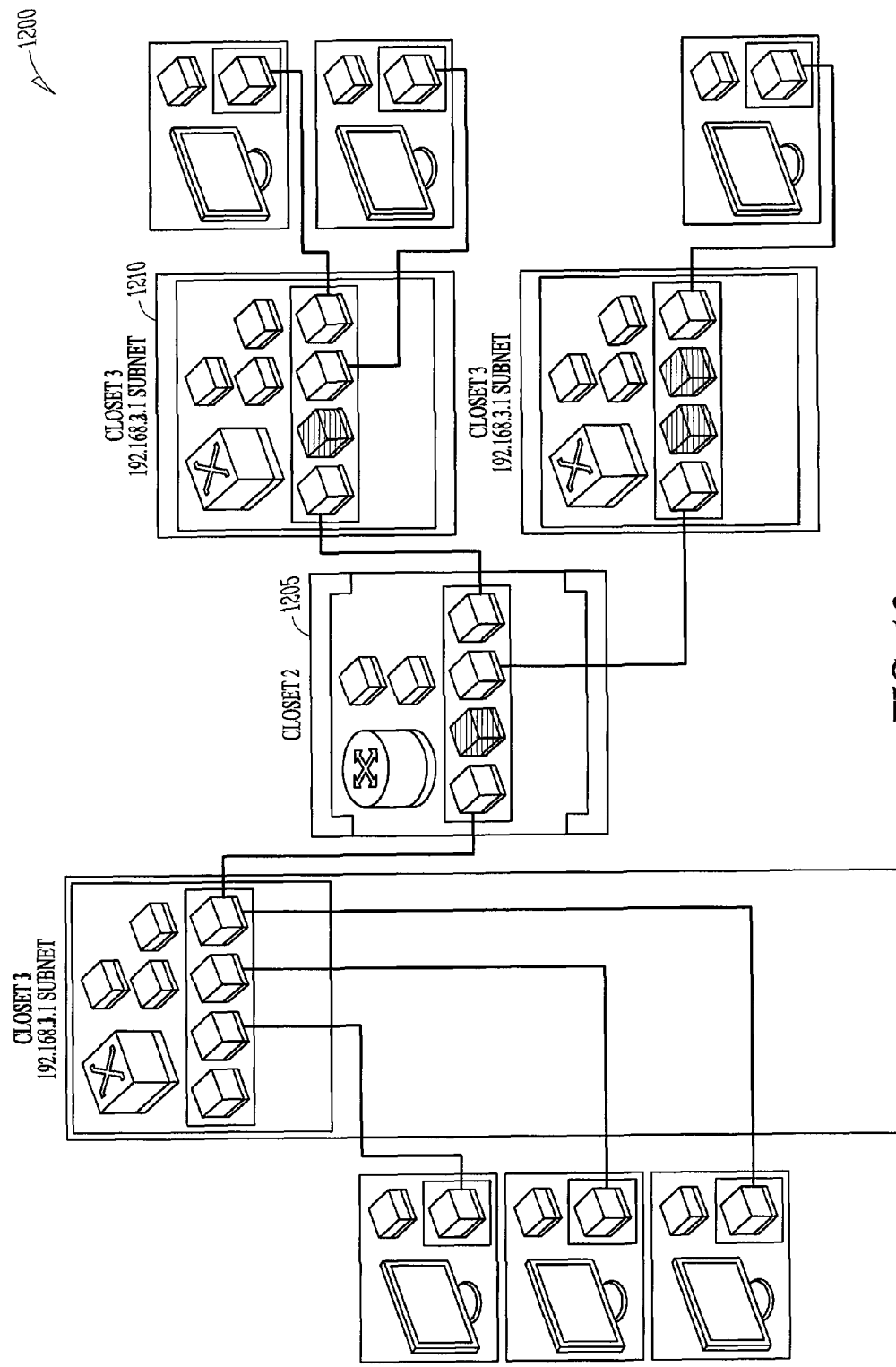
FIG. 12 is a block diagram of the example network of FIG. 8 following replacement of less efficient devices with efficient devices according to an example embodiment.

A network 1200 is illustrated in block diagram form in FIG. 12. Efficient new devices have replaced less efficient devices as indicated at router 1205 and switch 1210. These changes each save two units of power, resulting in a reduction from 32 units of power in network 800, to 17 units of power in network 1200, while performing the same amount of work.

Figure 13:
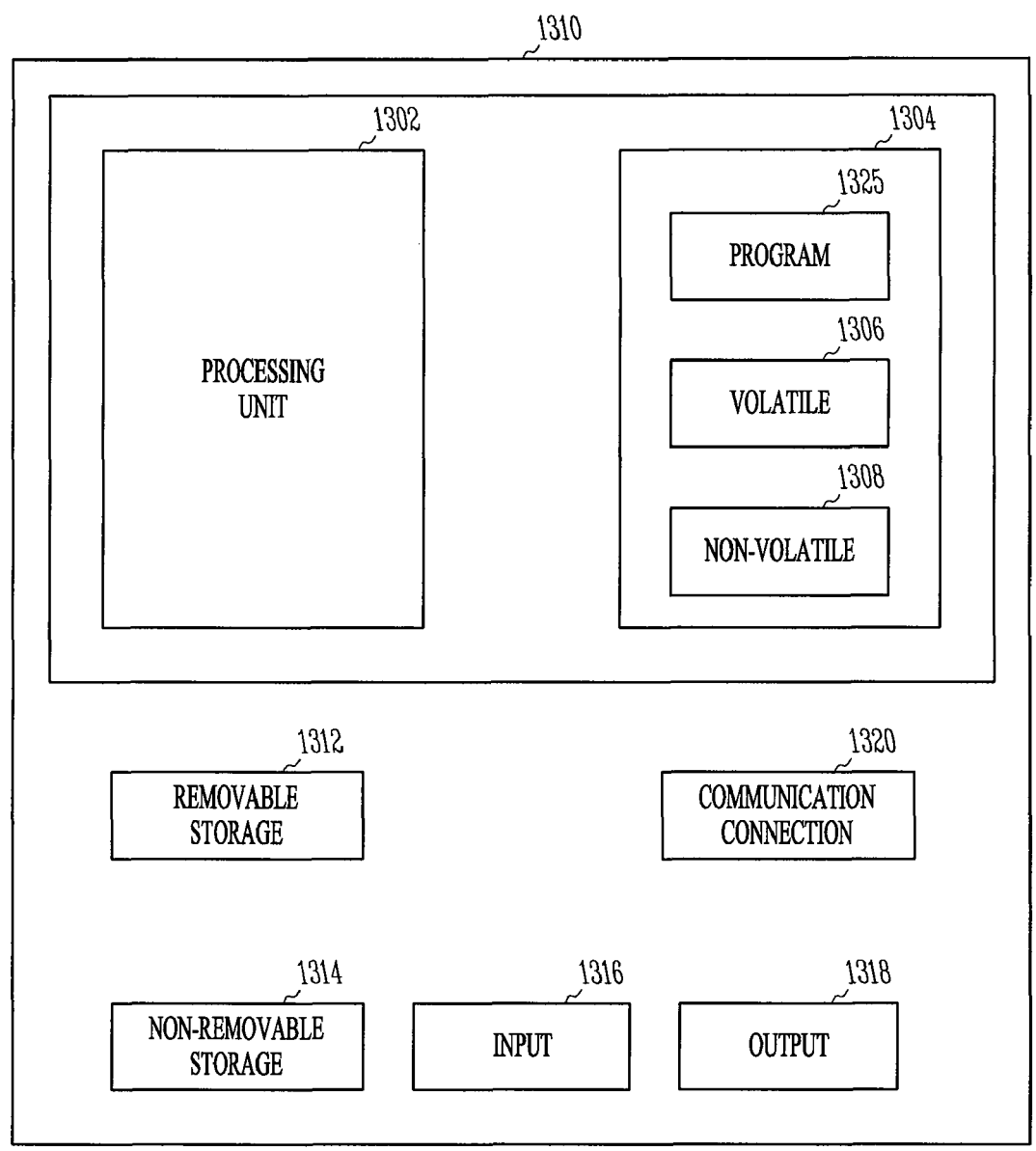
FIG. 13 is a block diagram of an example computer system for performing methods according to an example embodiment.

A block diagram of a computer system that executes programming for performing the above algorithm is shown in FIG. 13. A general computing device in the form of a computer 1310, may include a processing unit 1302, memory 1304, removable storage 1312, and non-removable storage 1314. Memory 1304 may include volatile memory 1306 and non-volatile memory 1308. Computer 1310 may include—or have access to a computing environment that includes—a variety of computer-readable media, such as volatile memory 1306 and non-volatile memory 1308, removable storage 1312 and non-removable storage 1314. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 1310 may include or have access to a computing environment that includes input 1316, output 1318, and a communication connection 1320. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 1302 of the computer 1310. A hard drive, CD-ROM, and RAM are some examples of articles including a computer-readable medium.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A computer implemented method comprising: collecting in a computer storage medium information from multiple network devices regarding utilization over a predetermined period of time; identifying using a computer processor unused device resources; identifying using the computer processor device resources that may be consolidated by grouping boards by technology type and counting ports that are unavailable or available and determining whether ports may be consolidated to boards on a same device or to a different device; and providing such identifications to a user via an output device for use in consolidating the network to reduce power consumption; wherein consolidating the device resources comprises identifying how to transfer utilization from one device to another to reduce power consumption of the network.

2. The method of claim 1 wherein the information includes port information, board information, power supply information, routing tables and switching tables.

3. The method of claim 2 wherein unused ports are identified by zero throughput or a status of off for the predetermined period of time.

4. The method of claim 1 wherein consolidating the network comprises identifying network devices that can be turned off.

5. The method of claim 1 wherein consolidating the network comprises identifying devices to consolidate to other devices in order of greatest power consumed.

6. The method of claim 1 and further comprising identifying devices for swapping out with more efficient devices to reduce power consumption of the network.

7. The method of claim 1 wherein consolidating the network comprises mapping ports on multiple boards in a device and identifying ports for consolidation to other boards.

8. The method of claim 1 wherein identifying unused device resources comprises checking if a port is physically connected with a status of down, or configured off, or if port throughput increased over the predetermined period of time.

9. A computer implemented method comprising:
   collecting in a computer storage medium information from multiple network devices regarding utilization over a predetermined period of time;
   identifying using a computer processor unused device resources;
   identifying using the computer processor device resources that may be consolidated by grouping boards by technology type and counting ports that are unavailable or available and determining whether ports may be consolidated to boards on a same device or to a different device;
   identifying using the computer processor an efficient device that may be exchanged for existing devices by ensuring that the efficient device supports existing device port types at the same speed;
   providing such identifications to a user via an output device for use in consolidating the network to reduce power consumption.

10. The method of claim 9 wherein the collected information includes map routes and switch information from router devices and switch devices.

11. The method of claim 9 wherein the information includes port information, board information, power supply information, routing tables and switching tables.

12. The method of claim 11 wherein unused ports are identified by zero throughput or a status of off for the predetermined period of time.

13. The method of claim 9 wherein consolidating the network comprises identifying network devices that can be turned off.

14. The method of claim 9 wherein consolidating the network comprises identifying how to transfer utilization from one device to another to reduce power consumption of the network.

15. The method of claim 9 wherein consolidating the network comprises identifying devices to consolidate to other devices in order of greatest power consumed.

16. The method of claim 9 and further comprising identifying devices for swapping out with more efficient devices to reduce power consumption of the network.

17. The method of claim 9 wherein consolidating the network comprises mapping ports on multiple boards in a device and identifying ports for consolidation to other boards.

18. The method of claim 9 wherein identifying unused device resources comprises checking if a port is physically connected with a status of down, or configured off, or if port throughput increased over the predetermined period of time.

19. A tangible non-transitory computer readable medium having instructions stored thereon for execution by a computer to perform a method comprising: collecting information from multiple network devices regarding utilization over a predetermined period of time; identifying unused device resources;
   identifying device resources that may be consolidated by grouping boards by technology type and counting ports that are unavailable or available and determining whether ports may be consolidated to boards on a same device or to a different device; and providing such identifications to a user via an output device for use in consolidating the network to reduce power consumption; wherein consolidating the device resources comprises identifying how to transfer utilization from one device to another to reduce power consumption of the network.

* * * * *